United States Patent [19]

Toti

[11] 4,063,393
[45] Dec. 20, 1977

[54] PANEL ASSEMBLY STRUCTURE AND PROCEDURE FOR ASSEMBLING SAME

[76] Inventor: Andrew J. Toti, 311 W. River Road, Modesto, Calif. 95351

[21] Appl. No.: 358,950

[22] Filed: May 10, 1973

[51] Int. Cl.² .......................... E04B 1/32; E04B 2/32; E04B 2/72; E04D 3/362
[52] U.S. Cl. .......................... 52/245; 52/278; 52/281; 52/282; 52/309.4; 52/465; 52/479; 52/481; 52/410; 52/461; 52/52.2; 52/530; 52/531; 52/582; 52/588; 52/622
[58] Field of Search ................. 52/461, 464, 465, 470, 52/471, 494, 495, 497, 588, 479, 481, 522, 245, 281, 282, 410, 309.4, 530, 531, 582, 622

[56] References Cited

U.S. PATENT DOCUMENTS

| Re. 22,693 | 11/1945 | Lindsay | 52/497 X |
|---|---|---|---|
| 2,164,414 | 7/1939 | Long | 244/132 |
| 2,180,504 | 11/1939 | Bradfield et al. | 52/588 |
| 2,263,355 | 11/1941 | Fould | 52/497 |
| 3,205,001 | 9/1965 | Abolins | 52/494 |
| 3,226,891 | 1/1966 | Heirich | 52/73 |
| 3,290,077 | 12/1966 | La Barge | 52/583 X |
| 3,401,493 | 9/1968 | Lindner | 52/556 |
| 3,440,785 | 4/1969 | Denny et al. | 52/481 X |
| 3,524,292 | 8/1970 | Bottom | 52/522 |
| 3,708,938 | 1/1973 | Tantlinger | 52/588 X |

FOREIGN PATENT DOCUMENTS

| 202,340 | 7/1956 | Australia | 52/461 |
|---|---|---|---|
| 59,085 | 12/1953 | France | 52/464 |
| 912,415 | 12/1962 | United Kingdom | 52/245 |

Primary Examiner—Alfred C. Perham
Attorney, Agent, or Firm—Flehr, Hohbach, Test, Albritton & Herbert

[57] ABSTRACT

A panel assembly comprised of two or more pre-formed panel members securely joined operatively with each other without utilizing separate fastening means. The panels employed utilize pre-formed snap locking means provided along margins thereof to effect interconnection of adjacent panels to each other or to a pre-formed connecting member interposed therebetween. The panel assembly may be incorporated into roof, ceiling and wall constructions, which may include integral corner joints depending upon structural requirements. Tools to assist in assembling panels into an integral assembly also are disclosed. The procedure of hook and snap-lock assembling a panel structure may be performed by hand; by utilizing the assistance of tools disclosed; or by utilizing other mechanical aids.

24 Claims, 20 Drawing Figures

PANEL ASSEMBLY STRUCTURE AND PROCEDURE FOR ASSEMBLING SAME

BACKGROUND OF THE INVENTION

1. Field of the Invention

This invention relates to the field of panel assembly structures and to procedures for operatively joining a panel into such an assembly. More particularly, this invention relates to the field of improved panel assembling methods, and to the resulting panel assembly structures, which may be used in producing a wide variety of decorative and structural assemblies: such as wall and ceiling structures for mobile homes and other residences, as well as offices or other buildings; decorative and structural panels for use in furniture, trailers and boats; and other structures in which it is desired to join together two or more panels directly with each other, or with an intermediate connecting member, without requiring separate fastening means, such as screws, bolts, welds or the like.

Still more particularly, in alternate embodiments of this invention, the same relates to a panel assembly structure defined by two or more panel members, such as preformed sheet metal or plastic panels, which are rigidly and securely interconnected with each other or with an intermediate connecting member, such as an extrusion of pre-formed metal or plastic, such interconnection being effected in hook and snap lock fashion in a rapid procedure without requiring separate fastening means.

2. Description of the Prior Art

Panel assembly structures, and procedures for assembling panels into such an assembly, have been generally known in the art heretofore. However, so far as is known, the particular panel assembly structures and assembling procedures disclosed herein have not been utilized or known heretofore. Nor, so far as is known, have two or more panel members been integrally joined with each other without requiring separate fastening means in the particular manner and utilizing the particular features disclosed herein.

Furthermore, so far as is known, the novel manner in which pre-formed panel members of the type herein described, which are rigidly and securely interconnected with other into an assembly structure without requiring permanent deformation of the panels to effect such interconnection, has been unknown heretofore.

Characteristic of prior known structural and decorative panel assemblies by means of which sheet metal or like panels are integrally connected with each other or with a supporting or connecting member, are the patents to:

Gemunden et al. U.S. Pat. No. 380,199, Mar. 27, 1888
Peremi et al. U.S. Pat. No. 1,984,232, Dec. 11, 1934
Long U.S. Pat. No. 2,164,414, July 4, 1939
Bancroft U.S. Pat. No. 2,776,735, Jan. 8, 1957
Wredenfors U.S. Pat. No. 3,000,093, Sept. 19, 1961
Jewell U.S. Pat. No. 3,028,192, Apr. 3, 1962
DeRidder U.S. Pat. No. 3,055,461, Sept. 25, 1962
Abolins U.S. Pat. No. 3,205,001, Sept. 7, 1965
LaBarge U.S. Pat. No. 3,290,077, Dec. 6, 1966
Longville et al. French Pat. No. 524,344, Nov. 17, 1953

While the above identified patents disclose various procedures for assembling panel members, or for connecting deformable panel members to a supporting structure, the improved features of the present panel assembly structure and assembling method are neither disclosed nor suggested therein; none of such patents discloses pre-formed panels which are rapidly and effectively interconnected directly with another panel or with an intermediate connecting member without requiring permanent deformation or distortion of the panel members or the utilization of separate fasteners to effect assembling thereof. That is, the prior art does not show or suggest an assembly procedure in which a pre-formed panel may be rapidly hooked in an assembled position and snapped locked in place in the manner disclosed herein. Nor does the prior art disclose wall or roof or ceiling structures of the type disclosed herein.

CROSS-REFERENCE TO RELATED APPLICATION

In applicant's copending application Ser. No. 100,189, filed Dec. 21, 1970 entitled "Structural Assembly Joint and Method for Forming Same" an improved procedure for joining two or more panels with an intermediate deformable connecting member is disclosed. However, such application does not disclose the invention of this application which utilizes an improved and rapid hook and snap lock procedure which does not require permanent deformation of the pre-formed panels being joined nor of the pre-formed connecting member utilized in effecting such joint.

SUMMARY OF THE INVENTION

The present invention relates to an improved panel assembly structure and to a method and procedure for assembling panels into an integral decorative and structural panel construction. More particularly, this invention relates to a panel structural assembly defined by two or more panels having preformed marginal portions thereof which are designed to lockingly interfit with each other or with a pre-formed connecting member interposed therebetween. Still more particularly, this invention relates to a panel assembly structure comprising one or more pre-formed panel members integrally connected in operative relationship with each other or with an intermediate connecting member without requiring separate connecting means to effect such assembly, such as bolts, screws, rivets, welds or the like.

This invention further relates to an improved panel assembly structure defined by one or more panels each of which is provided with pre-formed hook and lock connecting means along a margin thereof which is designed to be rapidly and easily interfitted with a compatibly pre-formed portion of another panel or of an intermediate connecting member. In that regard, the panel assembly structure of the present invention is specifically designed to be produced without requiring permanent deformation of the pre-formed panels to be operatively interconnected with each other, as a result of which an assembly joint may be effected by merely hooking and snapping a panel member into place in the assembly in a rapid, easy to effect procedure.

This invention also relates to improved ceiling, roof and wall constructions, fully insulated as desired, which utilize the improved hook and lock panel assembly structure and procedure of this application.

From the foregoing, it should be understood that objects of this invention include the provision of an improved panel assembly structure comprising one or more panels directly interconnected with each other or with an intermediate connecting member interposed between a pair of panels; the provision of an improved assembly procedure for integrally joining a pre-formed panel to another panel or to an intermediate connecting member; the provision of a panel assembly structure and assembling procedure for interconnecting a plurality of panel members into a securely interconnected panel assembly well suited for meeting decorative and structural functions; the provision of an improved panel assembly joint structure and procedure for assembling the same by means of which one or more panels may be securely hook and snap-lock connected in a predetermined orientation to another panel or to a connecting member without requiring separate fastening means therefor; and to the provisions of improved roof, ceiling or wall constructions utilizing an improved panel assembly structure and assembling procedure.

These and other objects of this invention will become apparent from the study of the following detailed disclosure in which reference is directed to the appended drawings.

DESCRIPTION OF THE PREFERRED EMBODIMENTS

From the attached drawings, it will be noted that the subject invention may embody itself in various and varied forms. However, each of such embodiments employs and utilizes the basic concepts and novel panel assembly features, plus the secure interengagement capabilities, which are characteristic of this invention which permit positive and rapid interengagement of a panel with another panel or with an associated connecting member without requiring separate fastening means and without requiring permanent deformation of the panel members or connecting member during the assembly procedure. Additionally, each embodiment of the panel assembly structure disclosed herein may be produced by utilizing a simple hook and snap-lock procedure which requires no special skills or training. Thus, wide adaptability and applicability for a wide variety of uses, both decorative and structural, is provided by the subject invention.

The various embodiments disclosed herein will be considered generally in the order the same are illustrated in the drawings. It will be noted that in all illustrated embodiments the panel members utilized are pre-formed generally to the configuration which such panels retain following their assembly into a structural joint.

Figure 1:
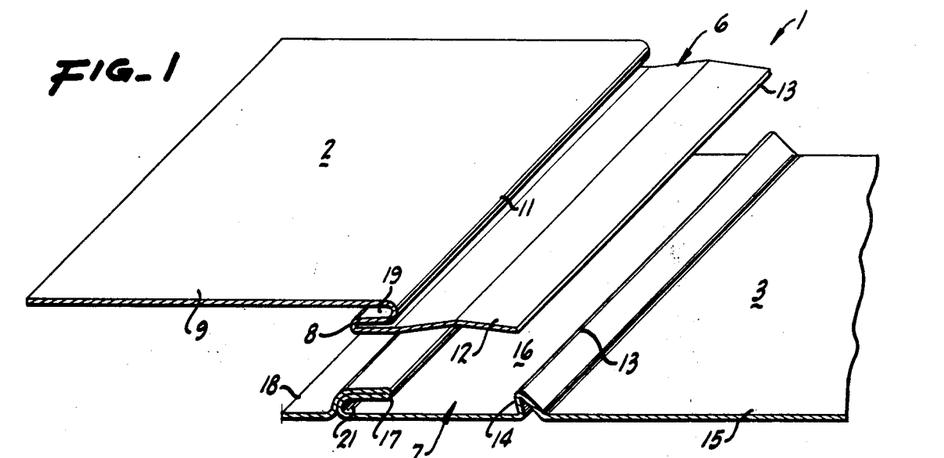
FIG. 1 is an isometric view of one embodiment of this invention in which a panel assembly structure is defined by two pre-formed panel members contoured to be interfitted directly with each other.
Figure 2:
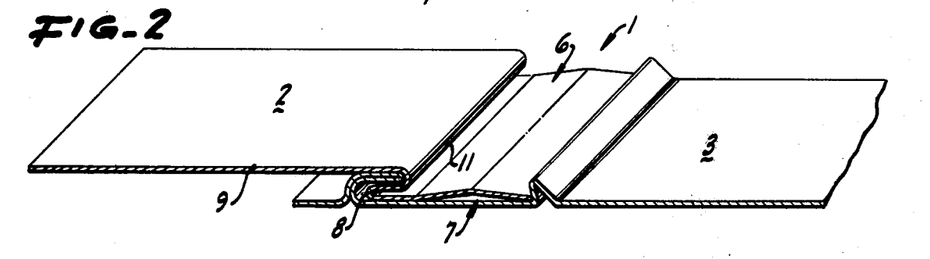
FIG. 2 is an isometric view corresponding generally to FIG. 1 showing the two panel members securely interconnected in a panel assembly structure.
Figure 3:
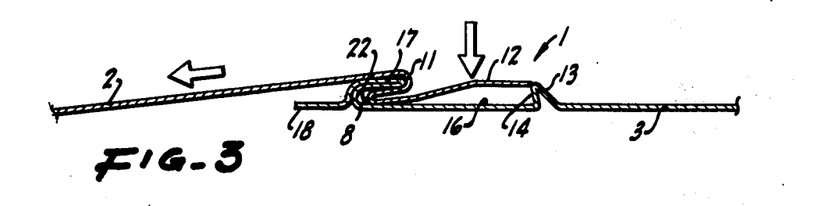
FIG. 3 is an end view of the panels of FIGS. 1 and 2 illustrating the procedure for hook and snap-lock interconnecting the same directly to each other.

Referring first to FIGS. 1 through 3, the simplest embodiment of this invention illustrated in the drawings is shown. Such figures illustrate a panel assembly structure, generally designated 1, and the procedure for assembling such a structure into an assembly joint without requiring special tools or separate fastening means to maintain the panels securely interconnected with each other. In that regard, the illustrated assembly structure is defined by and comprises a pair of pre-formed panel members 2 and 3. Each panel is formed from a suitable metal or plastic material which possesses substantial rigidity coupled with resilience. Sheet aluminum has been found to be a highly effective material for forming the panels of all embodiments of the assemblies disclosed herein.

Each panel 2 and 3 is pre-formed to the configuration noted in FIGS. 1 through 3 to include hook and snap-lock connecting means which permits simple and rapid interconnection of the panels with each other into a secure panel assembly structure. In that regard, panel 2 includes an elongated generally flat deformable marginal tongue section 6 designed to be securely interfitted with a slotted marginal section 7 pre-formed in panel 3. To that end, tongue section 6 extends transversely of panel 2 and is defined by a reversely bent hook portion 8 which is integral with and underlies the main body portion 9 of panel 2. Hook portion 8 is connected with the panel body by a bent shoulder portion 11. Tongue 6 includes a slightly bowed strut section 12 which terminates in a generally straight edge 13 which defines one end margin of panel 2.

The slotted marginal section 7 of co-operable preformed panel 3 includes an upstanding ridge 13 extending transversely of the panel which separates the main body portion 15 of the panel from the slotted marginal section 7. Ridge 13 includes a generally upright slightly undercut generally rigid and unyielding abutment shoulder 14 which is interposed between the ridge and a generally flat base portion 16 of the slotted marginal section. The marginal section further includes a reversely bent hook portion 17 which overlies at least part of base 16. Hook portion 17 terminates in a generally flat edge portion 18 which defines a free edge of panel 3. It should be understood that the panels 2 and 3 (as well as other panels employed in other embodiments herein) may be of varying sizes to meet particular decorative or functional needs.

It should further be noted from FIGS. 1 through 3 that the reversely bent hook 8 of panel 2 is spaced from the main body portion 9 by a narrow channel 19 extending transversely of the panel. Hook portion 17 of panel 3 similarly is spaced from the base 16 of the slotted portion 7 by a narrow channel 21 extending transversely thereof. The dimensions of channels 19 and 21 are determined in accordance with the relative thicknesses of the hook portions 8 and 17 so that a relatively snug fit exists therebetween when the panels are interengaged as seen in FIG. 2.

In that latter regard, interengagement of the two pre-formed panels is rapidly and easily effected without requiring special tools by positioning hook 8 of panel 2 within and beneath hook 17 of panel 3 in the manner seen in FIG. 3. By moving panel 2 in the direction of the left hand arrow in FIG. 3, the hook portions of the respective panels are brought into snug interengagement as seen in FIG. 3. Thereafter, it is merely necessary to depress the tongue section 12 of panel 2 downwardly in the direction of the right hand arrow shown in FIG. 3 to bring end edge 13 thereof into secure snaplock engagement with the upright abutment 14 of panel 3.

The dimensions of the interengageable pre-formed panels sections are selected so that such hook and snap-lock interconnection in the manner seen in FIG. 3 may be easily effected without expensive special tools. Depending upon panel size, such interconnection may be effected manually without requiring any tools at all. In that regard, the interengageable sections of the panels are dimensioned so that hook 8 of panel 2 is slightly shorter than hook 17 of panel 3. Thus, a space 22 is provided between the hooks (FIG. 3) which permits depressing of tongue 12 into substantial contact with base 16 when the panels are joined together.

As seen in FIG. 2, the panels are securely interconnected against separation without requiring separate fastening means and may be separated only with substantial difficulty by prying the two panels apart.

In that regard, tongue section 12 is securely wedged in place to maintain the panels securely assembled across their full transverse dimension. As noted previously, tongue 12 of panel 2 is slightly bowed to enhance the wedging and locking effect between the panels 2 and 3. However, tongue 12 may also be formed essentially flat so that the same may lie in substantial contact with the base 16 without departing from the spirit of this invention. In either event, while temporary deformation of tongue 12 may result during wedging of the same in place, permanent distortion or deformation of neither of the panels is required to effect the secure hook and snap-lock type joint shown in FIG. 2.

Figure 4:
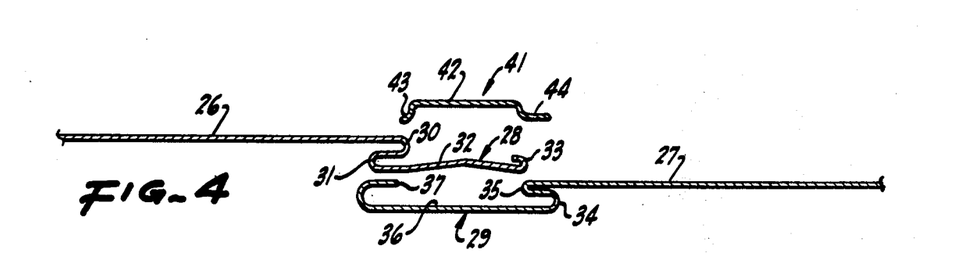
FIG. 4 is an end view of a modified disassembled panel assembly structure defined by two pre-formed panels and a decorative closure strip snap-lock engageable therewith.
Figure 5:
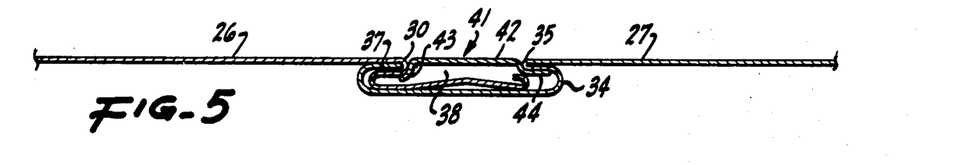
FIG. 5 is an end view of the assembly of FIG. 4 showing the same fully assembled.

FIGS. 4 and 5 illustrate a modification of the panel assembly structure shown in FIGS. 1 through 3. In that embodiment, a somewhat more decorative structure is illustrated which is defined by two directly interconnectable panels 26 and 27 pre-formed to the configurations shown. Panels 26 and 27 include pre-formed hook and snap-lock connecting means defined by interfittable tongue and slot sections 28 and 29, respectively. Tongue section 28 is defined by a reversely bent hook portion 31 which underlies a bent shoulder 30 of the main body portion of panel 26. The tongue is defined by deformable strut section 32 which is slightly bowed and terminates in a reversely bent edge 33. The slotted section 29 of panel 27 is defined by a reversely bent generally rigid and unyielding abutment shoulder 35 which is interposed between the main body portion of the panel and a reversely bent channel portion 34. Slotted section 29 further includes a generally planar base 36, which terminates in a reversely bent hook 37 which overlies the base.

The two panels 26 and 27 may be hooked and locked with each other in much the same fashion as described previously with respect to FIG. 3, namely hook 31 of panel 26 is engaged beneath hook 37 of panel 27. Thereafter, the strut section 32 of panel 26 is depressed until the reversely bent edge 33 is snapped beneath the abutment shoulder 35. When in such position, the bent edge 33 and the abutment shoulder may have a slight space therebetween to accommodate another member of the illustrated assembly.

In that connection, the assembly of FIGS. 4 and 5 is designed to be somewhat more decorative than the embodiment shown in FIGS. 1 and 3. To that end, the same is provided with decorative means for substantially closing off the slotted opening, designated 38, which extends transversely of the panels when the same are interconnected in the manner described. Such decorative means comprises an elongated closure strip or cap generally designated 41. Such strip is defined by a generally flat central section 42 and a pair of bent end margins 43 and 44 extending longitudinally thereof. Strip 41, when properly positioned, closes off the opening 38 which would be visible therebetween in the absence of such decorative strip.

To that end, the strip is inserted in operative engagement with the panels by first inserting marginal edge 44 between the reversely bent edge 33 of panel 26 and the abutment shoulder 35 of panel 27. By moving the strip as far to the right as possible with the margin 44 thus inserted, it is possible to depress the opposite margin 43 into the opening 38 and to snap the same beneath the bent shoulder 30 of panel 26. The strip is thus held securely in place between the two shoulders 30 and 35 of the respective panels to substantially completely close off the channel opening extending between the interconnecting panels.

By forming the decorative strip 41 from the same material as the panels, a generally continuous and smooth panel assembly surface is presented to the viewer.

From FIGS. 1 through 5 is should be apparent that panel assembly structures, highly decorative in nature and ones which may be easily interconnected and assembled, are illustrated. Such assembly structures may be utilized for various decorative and structural purposes, such as to provide sidewall panels for desks and other pieces of furniture, for fabricating boats, and various other uses. In that connection, it should be understood that under most cases the panel assembly structure illustrated would be supported by a suitable framework against which the panels are positioned and secured in any suitable fashion, by utilizing conventional fasteners or adhesives.

In the embodiments of the invention illustrated and described thus far, two panels are directly interconnected with each other by utilizing pre-formed interengageable marginal portions thereof. In the following modifications, two or more panels are operatively interconnected with each other by utilizing an intermediate pre-formed connecting member of the type to be described. While such a connecting member is utilized in the modifications discussed hereinafter, it should be understood that the basic principles which permit panels to be simply and rapidly hooked and snap-locked together are also utilized.

Figure 6:
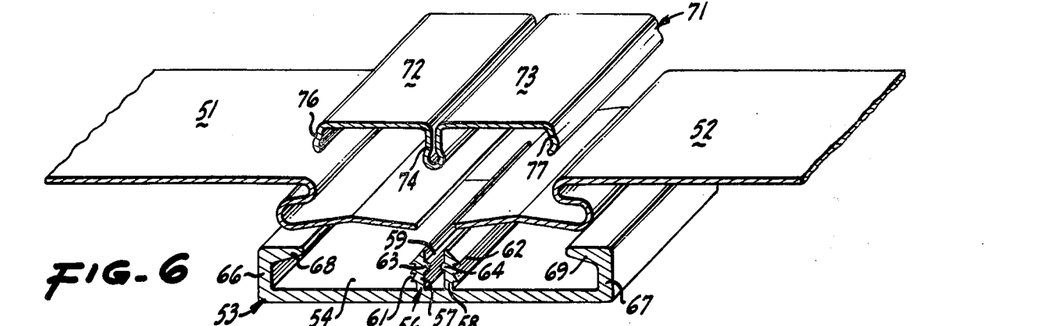
FIG. 6 is an isometric view of a modified panel assembly structure in disassembled condition defined by two pre-formed panels, an intermediate connecting member, and a decorative strip.

FIG. 6 illustrates the disassembled components of a panel assembly structure which utilizes as a component thereof separate means for interconnecting two panels in substantially coplanar relationship. In that regard, panels 51 and 52, each of which is pre-formed generally in line with the configurations of panels 2 and 3 described previously, are to be integrally joined with each other in a panel assembly by utilizing specially designed connecting means.

In the embodiment illustrated, such connecting means comprises a pre-formed channel shaped elongated member generally designated 53 formed from a suitable metal or rigid plastic. The connecting member 53 is defined by a generally planar base 54 generally centrally of which projects an elongated abutment shoulder structure 56 defined by a pair of generally upstanding parallel ribs 57 and 58 which are spaced laterally from each other and define a longitudinal groove 59 therebetween. The ribs 57 and 58 are generally rigid and unyielding and include a series of inclined ratchet teeth 61 and 62 on their outer surfaces which extend longitudinally of the ribs for their full length. Internally, the ribs are provided with opposed rounded beads 63 and 64 in groove 59, the purpose of which will be described hereinafter.

The base 54 of the connecting member terminates at each of its marginal edge portions in a pre-formed upstanding wall 66 and 67, respectively, each of which is surmounted by a shoudler, 68 and 69, having a tapered configuration and thickness as shown. Each wall and its associated shoulder thus defines a hook portion along each margin of the connecting member. Thus, the connecting member is defined as a pair of side by side elongated slotted channel portions divided by the upstanding shoulder structure 56.

Figure 7:
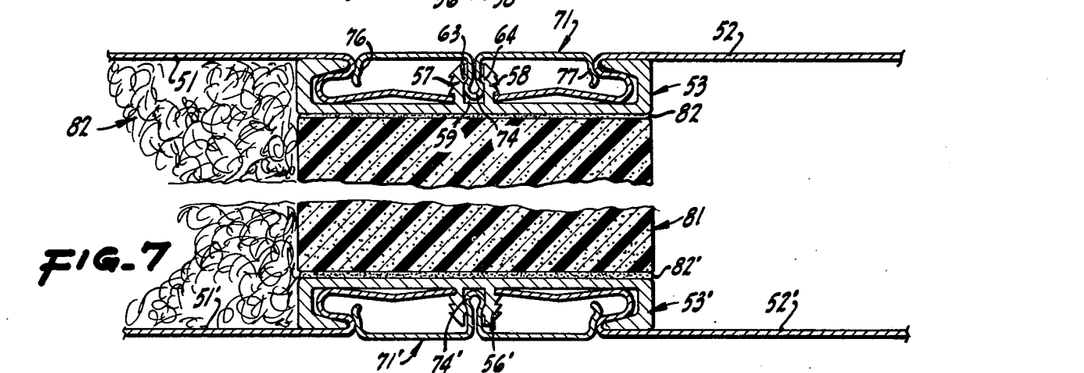
FIG. 7 is a vertical sectional view through a roof and/or ceiling structure utilizing the panel assembly structure shown in FIG. 6.

Referring to the top portion of FIG. 7, it will be readily understood that each of the panels 51 and 52 may be hooked and snap-locked into place with the respective channel portions of the connecting member in the same fashion illustrated in FIG. 3. The ratchet teeth 61 and 62 on the upstanding ribs 57 and 58 permit secure interengagement of the end margins of the panels with the ribs in the manner seen in FIG. 7 upon downward pressure being applied to the end margins of such panels. In that regard, it will be noted that the hook portions of the panels 51 and 52 are of slightly less length than the hook portions of the connecting member 53 so that the panels may be readily snap-locked in place.

When the panels are securely interengaged with the connecting member as seen in FIG. 7, if desired a decorative closure strip may be engaged with the connecting member and the panels connected therewith to close off and cover the channel portions which would otherwise be visible in the joint defined by the assembly structure. In that regard, referring to FIG. 6, a pre-formed closure strip 71 is illustrated which is defined by a pair of adjacent generally coplanar sections 72 and 73 which are separated from each other by an integral bulbous-shaped depending rib 74, Opposite margins of the closure strip are defined by downwardly bent and inwardly curved edges 76 and 77 which are to be snap engaged generally beneath the shoulders which define the hook portions of panels 51 and 52 as seen in FIG. 7.

In that connection, the end margins 76 and 77 may be engaged in the position shown by depressing the bulbous portion 74 into engagement with the shoulder structure 56 of the connecting member. The enlarged end of the bulbous portion 74 is engaged in groove 59 beneath the beads 63 and 64 of the upstanding rib portion as seen in FIG. 7. Thus, the connecting strip may be securely held in place to define a substantially uninterrupted surface between the main body portions of the panels 51 and 52.

The embodiment of FIG. 6 lends itself well to forming a combined interior-exterior roof and ceiling structure for a mobile home or like construction. In that regard, the connecting member 53 may be secured to a spacer element which forms part of the supporting framework of the roof and ceiling structure, such as a length of material 81 formed from a suitable insulating material, or from metal, wood or the like (which in the embodiment illustrated in FIG. 7 is defined by a foamed insulating material) so an outer surface of the roof and ceiling structure may be provided. In that regard, the connecting member 53 in the embodiment illustrated is secured by a suitable adhesive 82 to the framework member 81. To provide leak-proof capability to the subject embodiment, the channels lying beneath the decorative strip 71 may be filled with a suitable sealant (not shown) which may be foamed in place and allowed to harden after the assembly structure shown at the top of FIG. 7 has been completed.

To provide the ceiling of such a roof and ceiling structure, an assembly joint corresponding to that shown at the top of FIG. 7 may be adhesively suspended beneath the framework member 81 as seen in the bottom of FIG. 7. To that end, similar reference numerals primed are utilized to identify similar components of the bottom portion of the combined roof and ceiling assembly.

To further enhance the utility of the combined construction shown in FIG. 7, the spaces between the opposed panels 51, 52, 51', 52' secured in place on opposite sides of the framework member 81 may be filled with a suitable insulation, such as glass fiber mats or the like, generally designated 82 in FIG. 7. It also should be understood that periodic framework members corresponding to member 81 are positioned at predetermined parallel spaced locations extending across the combined roof and ceiling assembly to provide a construction of desired size.

Figure 8:
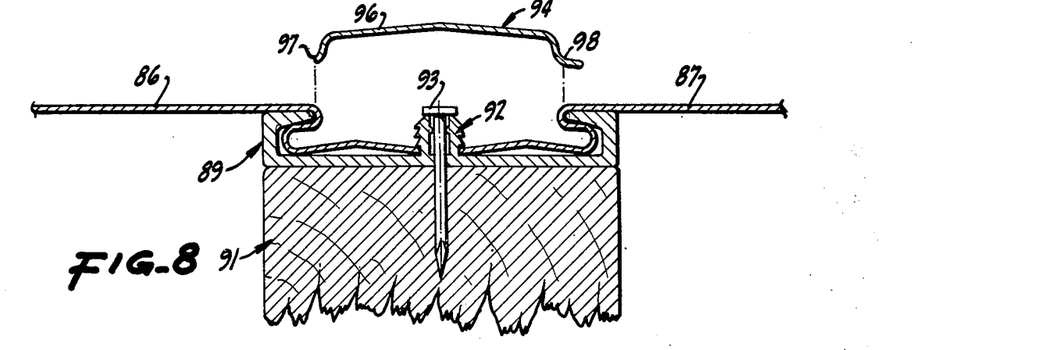
FIG. 8 is a modification of the panel assembly structure illustrated in FIG. 6, shown in vertical section, illustrated in conjunction with a supporting framework therefor.
Figure 9:
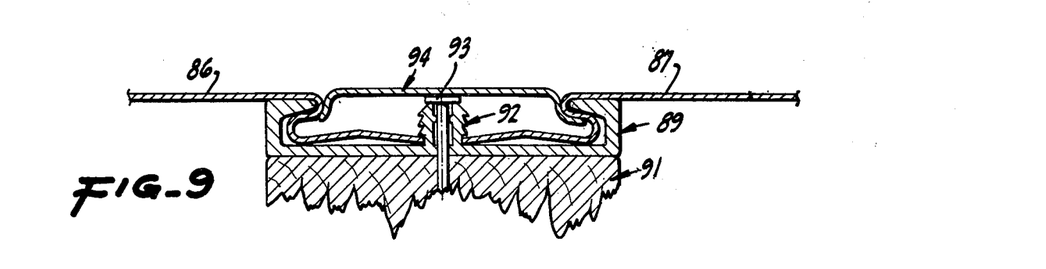
FIG. 9 is a vertical sectional view corresponding generally to FIG. 8 showing the assembly fully interconnected.

FIGS. 8 and 9 illustrate a further embodiment of this invention which corresponds generally to the features illustrated in FIGS. 6 and 7. However, the panels 86 and 87 which are interconnected with each other by the connecting member 89 in FIG. 8 are secured by alternate means to a wooden or like framework member 91 lying therebeneath. In that regard, the abutment shoulder portion 92 of the structural member 89 is penetrated by a series of nails 93 or like fasteners extending into and through the shoulder portion into a supporting framework including member 91.

To cover the shoulder portion 92 and the nails 93 or like fasteners spacedly positioned to extend therethrough, a decorative closure strip 94 is provided. Strip 94 is defined by an upwardly bowed central portion 96 which terminates along its opposite margins in downwardly bent edges 97 and 98 of unequal lengths. In that regard, end 98 is of somewhat longer length than edge 97 so that the former may be first inserted beneath the bent hook portion of panel 87, following which the opposite edge 97 may be snapped into engagement beneath the bent hook portion of panel 86. When thus positioned, the generally bowed central portion 96 of the strip may be flattened as seen in FIG. 9 to define a substantially coplanar continuation of the panels 86 and 87, whereby the channel portions of the connecting member 89 are substantially covered.

Figure 10:
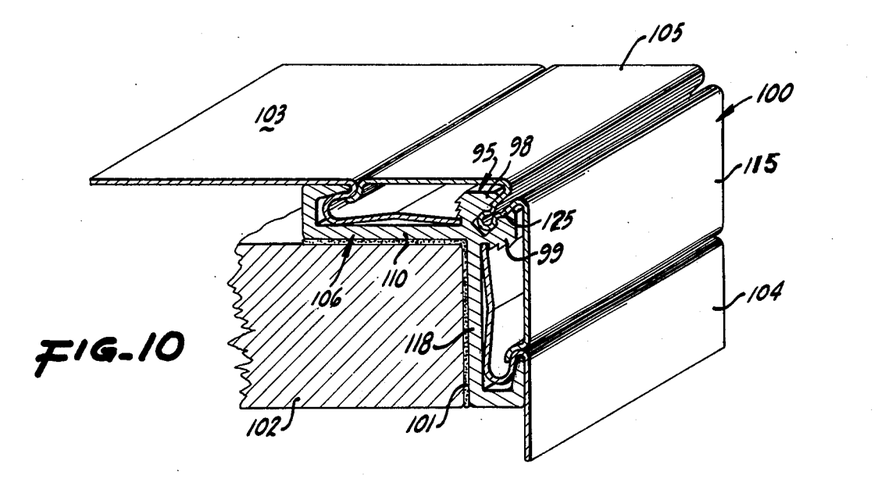
FIGS. 10 through 12 are isometric views illustrating further embodiments of the subject panel assembly structure shown incorporated into corner assemblies.
Figures 11, 12:
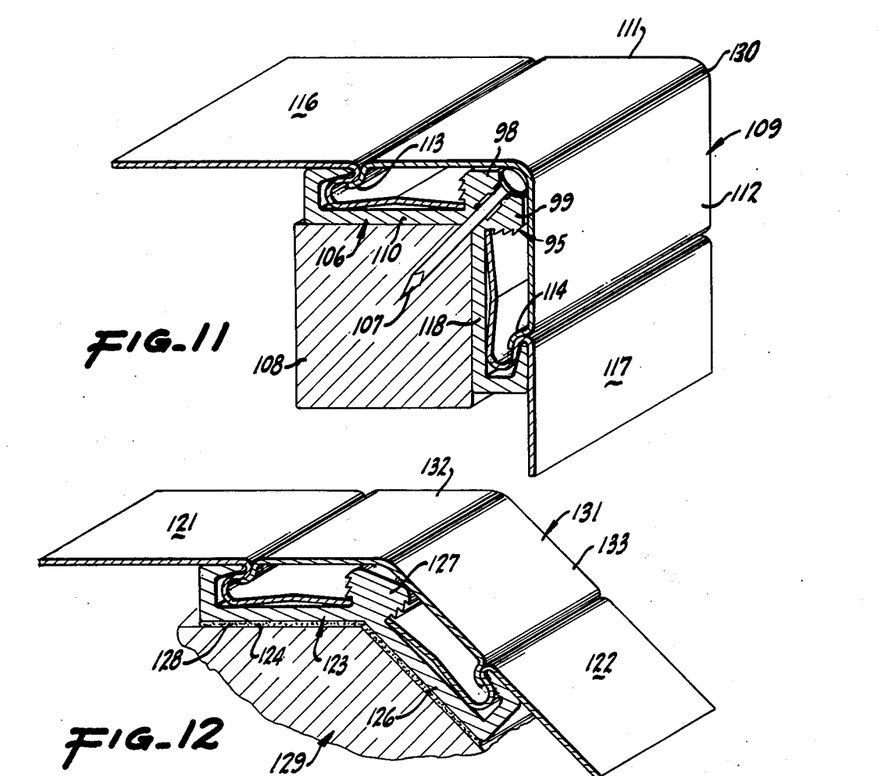

FIGS. 10 through 12 show further modifications of the novel panel assembly structure of this invention. Each of such embodiments illustrates corner joints formed between two angularly oriented panel members interconnected by a connecting member interposed therebetween. In FIG. 10 a connecting member 106 is illustrated which conforms generally to connecting member 53 shown in FIG. 6. However, connecting member 106 differs from the previously described connecting member in that the two adjacent channel portions 110 and 118 thereof are formed at right angles relative to each other. The abutment shoulder portion 95 thereof is defined by spaced generally rigid and unyielding ribs 98 and 99 which are positioned to overlie the center section which defines the right angled corner portion of the connecting member. With such an arrangement, the connecting member 110 may be secured by a suitable layer of adhesive 101 to a supporting wooden or like framework member 102 positioned therebeneath. Thus, a pair of panels 103 and 104 having pre-formed marginal edge portions of the type described previously with respect to FIGS. 1 and 6 may be hooked and snap-locked in engagement with the connecting member in the manner seen in FIG. 10.

Preferably a decorative closure strip 100 is utilized in conjunction with the FIG. 10 embodiment to close off the channel openings which would be visible between the interconnected panel portions and the connecting member. To that end, the closure strip 100 corresponds generally to that shown in FIG. 6 except that the respective sections 105 and 115 thereof are oriented generally at right angles to each other on opposite sides of a bulbous portion 125 to cover the angularly oriented sections of the connecting member. The closure strip is engaged with the connecting member in the same general fashion previously described.

FIG. 11 corresponds generally to FIG. 10 except that a series of nails or like fasteners 107 are utilized to secure the connecting member 94 in place with its right angularly oriented portions 110 and 118 overlying a supporting framework member 108 as seen. With the embodiment shown in FIG. 11, a decorative closure strip 109 also preferably is employed, which strip is different from that shown in FIG. 10 in that the same is defined by two right angularly oriented sections 111 and 112 which do not include an intermediate bulbous portion 125 as utilized in the FIG. 10 embodiment. The closure strip shown in FIG. 11 is provided with inwardly bent offset marginal sections 113 and 114 which may be snap-locked beneath the hook portions of the panels 116 and 117 being interconnected. An intermediate bent portion 130 of the strip overlies and contacts the respective ribs 98 and 99 of the abutment shoulder of the connecting member.

In FIG. 12 a further embodiment is illustrated in which a corner joint is formed at an angle other than 90°. In that regard, two panels 121 and 122 are interconnected by a preformed connecting member 123 which is defined by two angularly related body sections 124 and 126 which extend at approximately 45° relative to each other in the illustrated embodiment. An upright generally rigid and unyielding abutment shoulder portion 127 is interposed between the two body sections which is provided with ratchet teeth of the type described previously so that the panel members 121 and 122 may be securely interengaged with each other by using the connecting member. Such connecting member is adhesively secured by a layer of adhesive 128 to an underlying structural framework member 129 contoured in conformance with the angular relationship of the body portions of the connecting member.

A decorative closure strip 131 which corresponds generally to the strip 109 described previously with respect to FIG. 11 is also utilized in the FIG. 12 embodiment. Strip 131 differs from strip 109 described previously in that the body sections 132 and 133 thereof are oriented relative to each other at substantially the same angularity as the angle of the corner being made by the structural joint, which in the illustrated embodiment is approximately 45°. The procedure for assembling the panel structure shown in FIG. 12 corresponds to that shown in FIG. 11.

It should be understood that the structures shown in FIGS. 10, 11 and 12 may be utilized to define various constructions, such as exterior corners of mobile homes, pieces of furniture, or the like.

Figure 13:
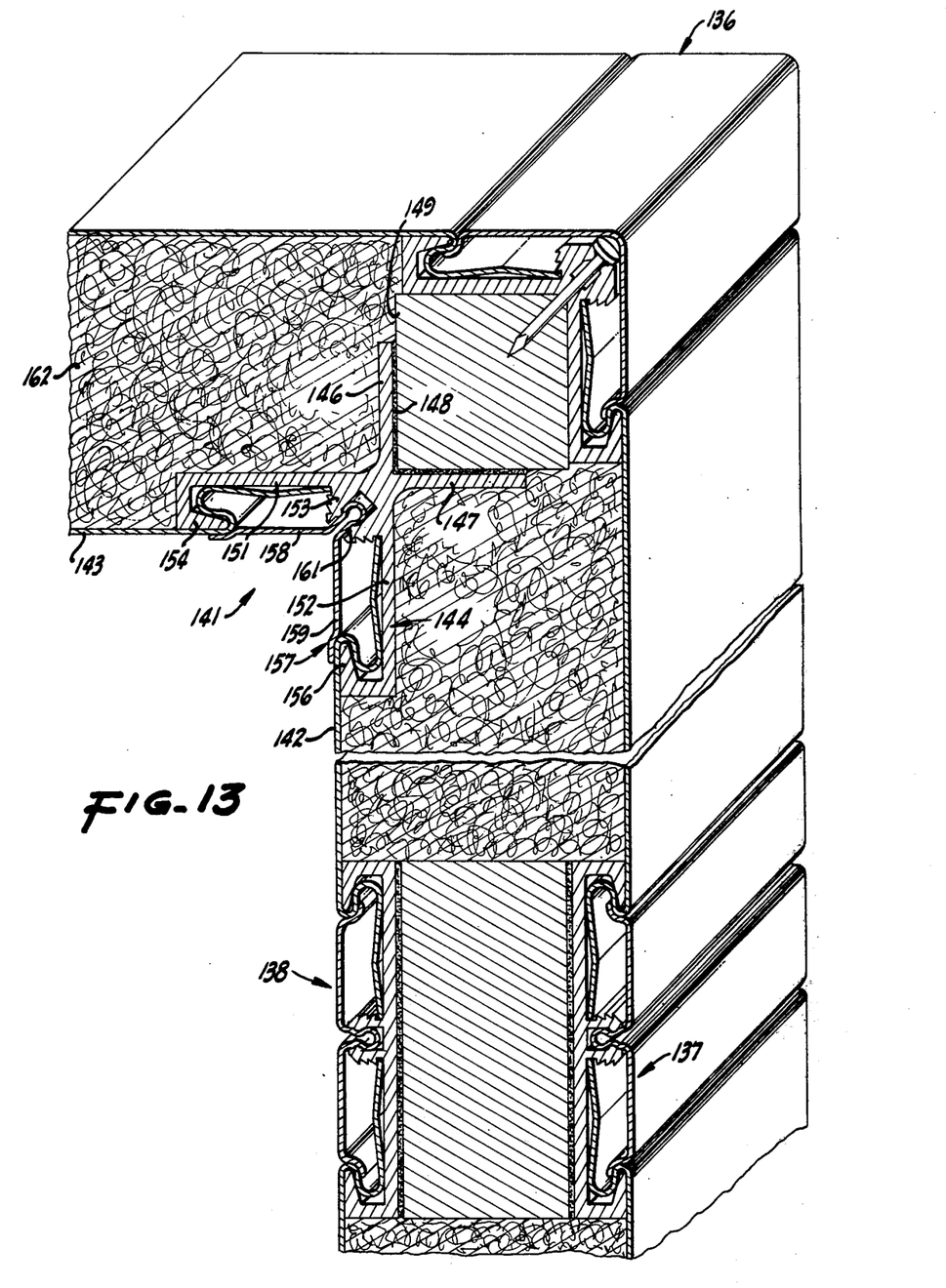
FIG. 13 is a sectional view through a roof, ceiling and wall construction which utilizes various modifications of the subject panel assembly structure.

In FIG. 13 a further extension of the novel features of the embodiments shown in FIGS. 10 through 12 is illustrated. In FIG. 13 a combined roof, ceiling and wall construction is illustrated which is well adapted for use in mobile homes or other residential or structural environments. FIG. 13 shows a panel assembly structure which combines both roof and ceiling and interior and exterior wall panels into a single assembly. By utilizing the various features shown in FIGS. 6 and 10, coupled with an internal corner joint assembly of the type to be described, such a composite construction may be readily produced.

In that regard, it will be understood that FIG. 13 utilizes an exterior corner construction of right angled configuration, generally designated 136, which corresponds in all important respects to the external corner construction shown in FIG. 10. Reference is directed to FIG. 10 for details thereof. Additionally, the interior and exterior sidewalls of the assembly shown in FIG. 13 are defined by interior and exterior panel assembly joints, designated 137 and 138 respectively, each of which corresponds to the panel assembly structures shown in FIGS. 6 and 7, and reference is directed thereto for details thereof.

FIG. 13, however, adds to the disclosure contained herein previously features which impart interior corner capabilities to the subject invention. In that regard, reference is directed to the interior corner panel assembly joint generally designated 141 in FIG. 13. Such internal joint is defined by interior ceiling and wall panel members 142 and 143 constructed in the same fashion as the panels shown and described previously in conjunction with FIGS. 1, 6 and 10. However, such panels 142 and 143 are interconnected with each other by utilizing a modified connecting member 144 which is generally X-shaped in overall configuration.

Such connecting member (as are the previously described connecting members) is formed as a metal or plastic extrusion to the shape illustrated and is defined by a first pair of right angularly oriented body sections 146 and 147 which are secured by a layer of adhesive 148 to the framework structural member 149 which underlies the outer corner joint assembly 136 and the inner corner joint assembly 141 as shown. Connecting member 144 further includes a second pair of right angularly oriented body sections 151 and 152 which are integrally formed with body sections 146 and 147. Interposed between body sections 151 and 152 is an generally rigid and unyielding upstanding abutment shoulder portion 153 which corresponds in construction to the abutment shoulder 56 described previously in conjunction with FIG. 6. The body portions 151 and 152 terminate at their free ends in hook portions 154 and 156 by means of which panels 142 and 143 may be hooked and snap-locked secured thereto in the manner described previously. Thus, with the specially designed connecting member 141 illustrated, an internal corner panel assembly structure may be utilized so that the inner wall and ceiling of a structure, such as a mobile home, may be defined.

To enhance the attractiveness of the internal corner joint, a decorative closure strip 157 preferably is provided which is defined by generally flat angularly oriented sections 158 and 159 which lie on opposite sides of an enlarged bulbous portion 161, the latter of which corresponds generally to the bulbous portion 74 described previously with respect to FIG. 6. Thus, such closure strip may be snapped in place in locking engagement with the abutment shoulder 153 to cover the channel openings between panels 142 and 143 and to hide connecting member 141 lying therebeneath.

It should be understood that a series of spaced structural framework members of wood, metal, foamed plastic, or other suitable materials are utilized to space the outer panels of the roof and exterior wall from the inner panels of the ceiling and interior wall of the assembly shown. Finally, it should further be understood that suitable insulation, such as glass fiber matting or the like, may be positioned between the inner and outer panels of the ceiling and roof and the inner and outer walls of the structure as shown in FIG. 13 by the reference numeral 162.

Figure 14:
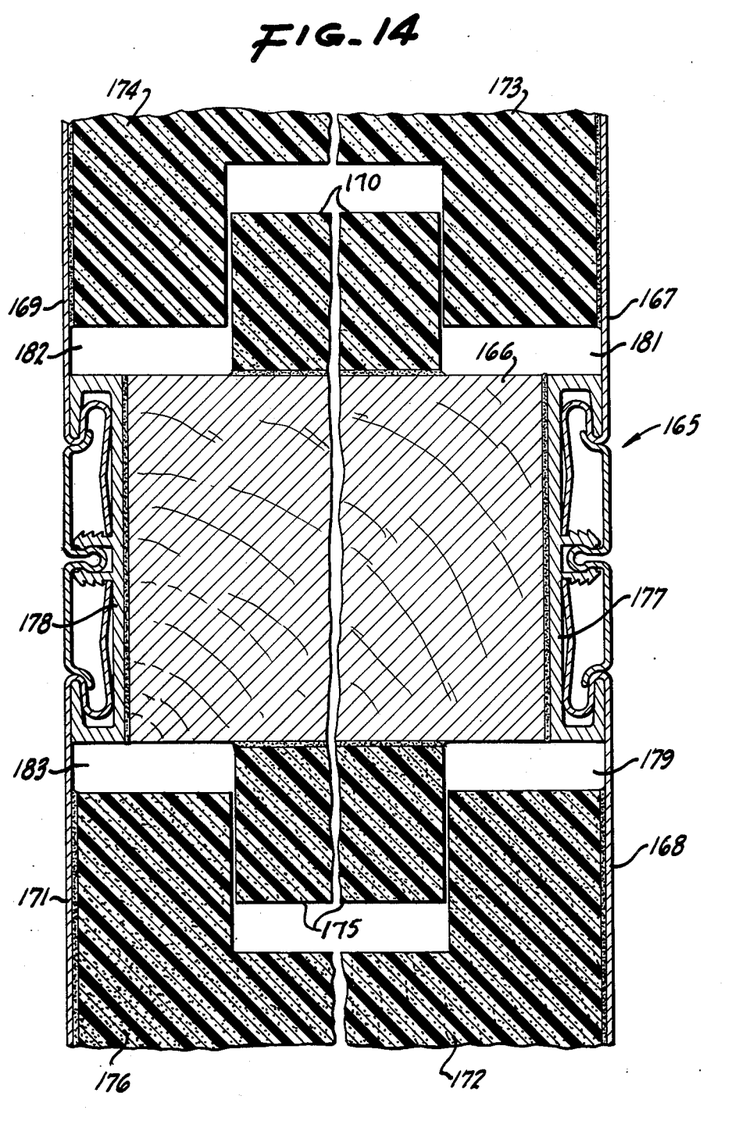
FIG. 14 is a vertical sectional view through a wall construction which illustrates a further modification of the subject panel assembly structure.

FIG. 14 shows a further embodiment of a vertical wall construction utilizing the novel features of this invention. In that regard, a composite inner and outer wall structure is illustrated which utilizes the basic features shown previously in conjunction with FIG. 7. Two back-to-back panel assemblies are shown which are adhesively secured on opposite sides of a wooden or like framework member 166 which extends generally horizontally through the wall. The FIG. 14 embodiment differs from anything illustrated herein previously in that self-supporting insulation panels of any suitable material (such as foamed plastic) are connected directly to and form an integral part of the panels 167 and 168 which define the outer wall of the assembly and opposed panels 169 and 171 which define the inner wall of the assembly. In that regard, insulation panels, generally designated 172, 173, 174 and 176 respectively, are adhesively secured to the inner surfaces of the respective wall panels as seen in FIG. 14. To completely insulate the wall structure, preferably short sections 170 and 175 of insulation material are attached to the framework member 166 to extend between the main insulation panels.

To permit the respective wall panels with their attached insulation panels to be hooked and snap-lock engaged with the respective connecting members designated 177 and 178, the insulation panels are cut away at 179, 181, 182 and 183 respectively, to provide the clearance required to effect the snap-lock interengagement as described previously. However, when the wall structure is assembed as shown in FIG. 14, it will be understood that adjacent insulation panels will be in generally back-to-back contact with each other so that substantially the entire space between the inner and outer wall panels 167, 168, 169 and 171 is filled by the insulation material. Thus, as seen from FIG. 14, the novel features of this invention are well suited to produce a fully insulated inner and outer wall panel assembly construction as shown. Also, as noted previously, a suitable sealant may be employed with any of the embodiments illustrated to produce leak proof and air tight panel assemblies.

Figures 15, 16, 17:
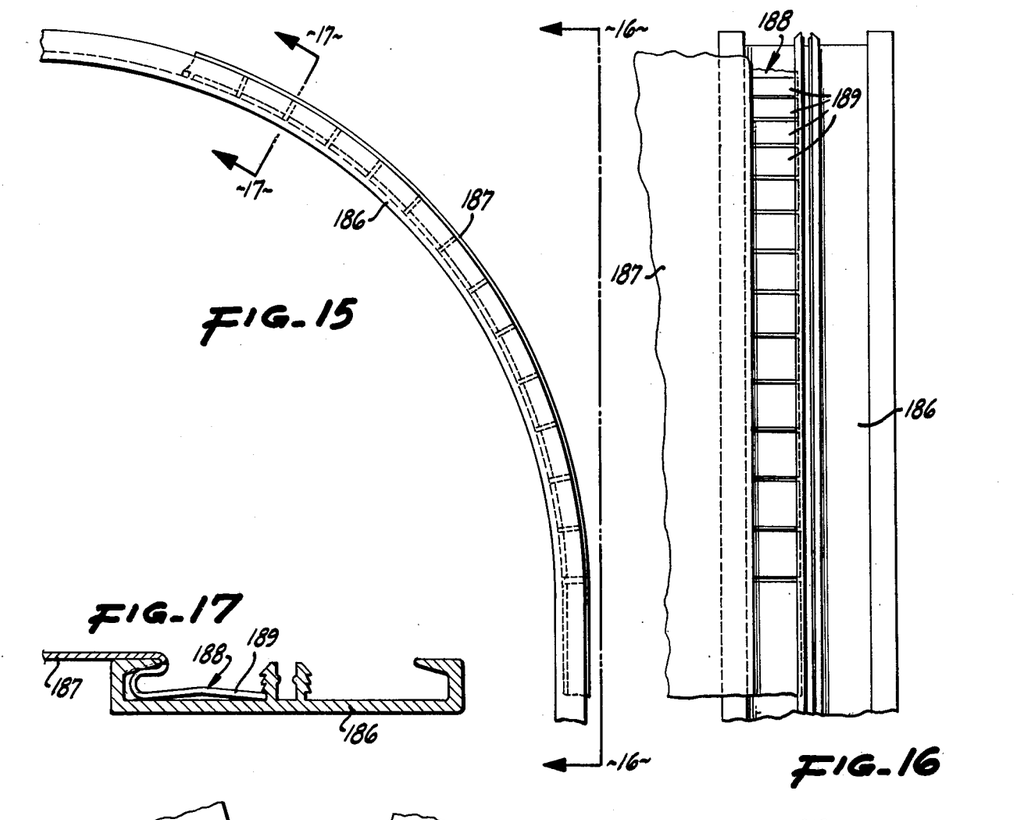
FIG. 15 is a vertical sectional view through a modified panel assembly structure incorporated into a curved assembly structure.
FIG. 16 is an elevational view of the assembly of FIG. 15 taken in the plane of line 16—16 of FIG. 15.
FIG. 17 is a generally vertical sectional view through the assembly of FIG. 15 taken in the plane of line 17—17 thereof.

In FIGS. 10 through 13, relatively abrupt angularly oriented panel assembly joints have been illustrated. In FIGS. 15 through 17 a further embodiment comprising a curvilinear panel assembly is shown. In that regard, a pre-formed connecting member 186 of elongated configuration is formed with a continuously curved body which imparts a curvilinear configuration to the panel assembly structure to be formed therefrom. As seen in cross section in FIG. 17, connecting member 186 is formed with the same configuration as the connecting member 53 described previously in FIG. 6.

The panel assembly shown in FIGS. 15 through 17 differs from the panel assemblies described previously in that it has been found necessary to alter the construction of the marginal tongue portion of the respective panels (only one of which is shown and designated 187) utilized in FIGS. 15 through 17. In that regard, panel 187 corresponds in all important respects to panel 2 described previously. However, the bowed deformable tongue portion 188 thereof is segmented to provide a plurality of independent locking tabs 189 as best seen in FIG. 16. Such tabs permit the panel 187 to be bent along the curvilinear path defined by the curved configuration of the connecting member 186 in the manner seen in FIG. 15.

In that regard, panel 187 prior to assembly with connecting member 186 is generally straight as seen in the lower portion of FIG. 15. When the panel member is connected with the connecting member 186 the individual tabs 189 are sequentially engaged within the connecting member between the abutment shoulder and the marginal hook portion as seen in FIG. 17.

Thus, a curved panel assembly structure may be produced without departing from the rapid hook and snap-lock interengagement procedure characteristic hereof.

As noted previously herein, certain of the embodiments illustrated herein may be joined into a panel assembly structure without requiring assitance of any mechanical tools. However, depending upon panel size and the dimensional tolerances desired between the panels utilized and the connecting members employed therefore, it has been found desirable to provide manually operable tools for assisting a person in assembling the panels into an integral panel assembly structure as described. While various tools may be utilized, some of which may be mechanically or electrically actuated, two such tools of simple construction are shown by way of illustration of FIGS. 18 and 19, each of which is intended for manual actuation.

Figure 18:
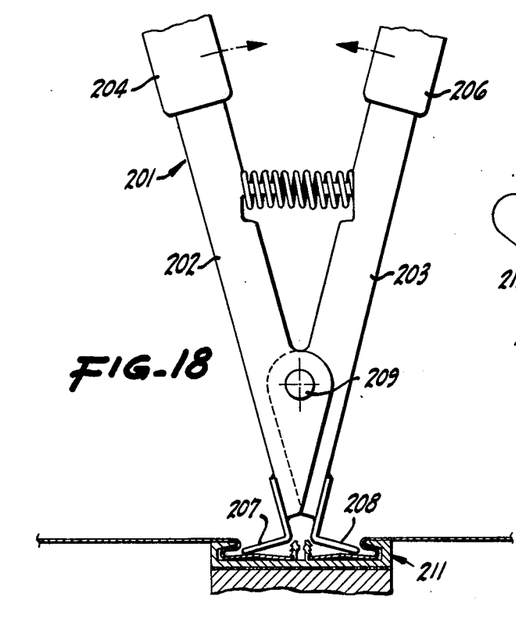
FIG. 18 is a front elevational view of a manually operable tool usable to assemble the panel assembly structures of the present invention.

FIG. 18 shows a scissors-type tool designated generally by reference numeral 201 which comprises a pair of pivotally interconnected arms 202 and 203 which terminate at their upper ends in a pair of graspable handle portions 204 and 206 and at their lower ends in rigid generally right angularly shaped legs 207 and 208. By pressing inwardly on the handle portions 204 and 206, the legs 207 and 208 may be spread outwardly relative to each other about the axis of a pivot pin 209 by means of which the tool is assembled. Such action causes one of the legs to engage an upright wall of a hook portion of the connecting member generally designated 211. Such spreading of legs 207 and 208 urges a hook portion of the panel to be interconnected with the connecting member outwardly toward the opposite upright wall of the other hook portion of the connecting member. Thus, the slightly bowed tongue section of the panel may be depressed to pass over the ratchet teeth of the connecting member to the fully seated position shown in FIG. 18.

Figure 19:
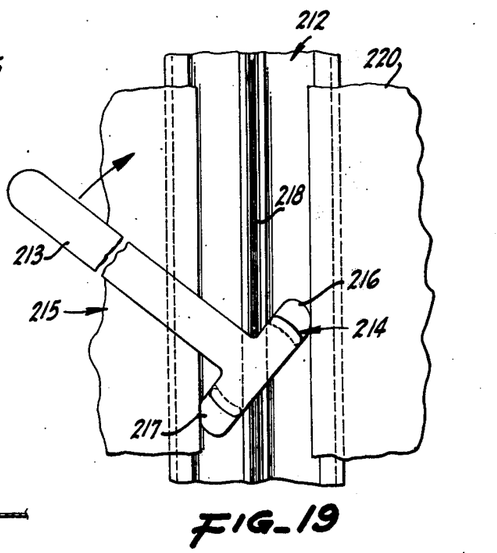
FIG. 19 is a plan view of another manually operable tool usable to assemble the panel assembly structures of the present invention.

FIG. 19 shows another manually actuatable tool for seating panels 215 and 220 in a connecting member generally designated 212. In that connection, such tool comprises an elongated manually graspable handle 213 which terminates in a T-shaped head 214 which is upwardly bowed so that ends 216 and 217 thereof may straddle the central abutment shoulder 218 of the connecting member. When the ends 216 and 217 of the tool are received beneath the hook portions of the rib as seen in FIG. 19, the tool may be rotated in the direction of the arrow shown in FIG. 19 to urge the panels singly or in unison away from the abutment shoulder 218 until the panels are fully seated in engagement beneath the hook portions of the connecting member in the manner described previously.

Figure 20:
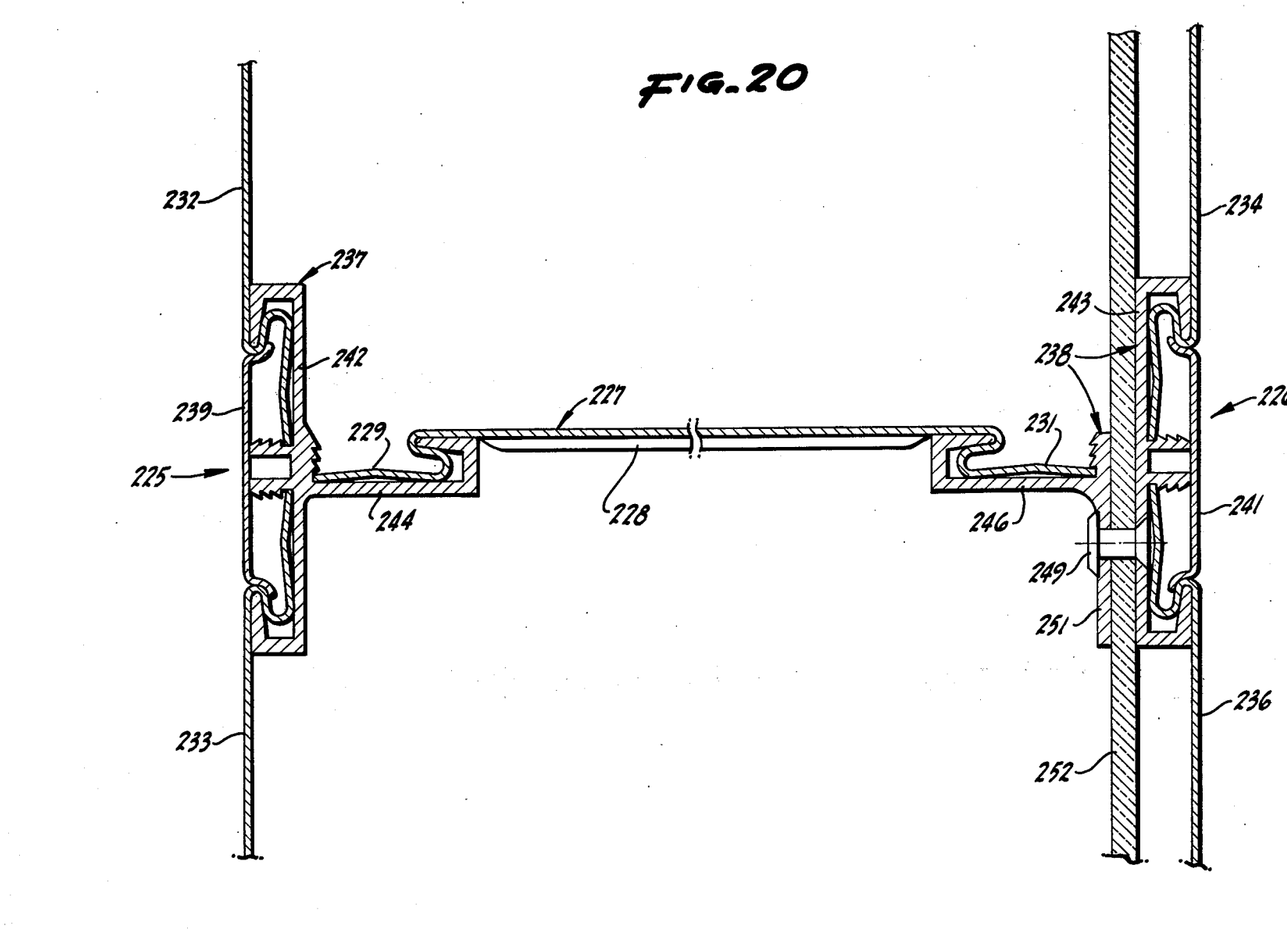
FIG. 20 is a vertical sectional view through a modified wall construction which illustrates another modification of the subject panel assembly structure.

FIG. 20 illustrates another embodiment of a wall or ceiling/roof construction utilizing the novel features of this invention. The embodiment illustrated in vertical section in FIG. 20 shows an internal/external wall combination which utilizes certain of the basic features of this invention as discussed previously with respect to FIGS. 7 and 14. In that regard, two back-to-back panel assemblies generally designated 225 and 226 are shown which are integrally connected with each other by a pre-formed spacer framework member 227 extending there-between and operatively engaged therewith.

It should be understood that the framework member 227 may extend the length of the wall between the inner and outer panel assemblies 225 and 226. However, in the preferred embodiment, the framework member is constructed to extend only a short distance of the total length of the wall construction; that is, spacer member 227 is relatively short in transverse dimension and a plurality of similar spacer framework members (not shown) are positioned at spaced parallel locations within the wall construction to maintain the inner and outer panel assemblies 225 and 226 securely interconnected with each other.

In that regard, each spacer framework member 227 utilized has one or more strengthening ribs 228 extending longitudinally there of to resist deformation thereof in the transverse direction. Along each of its opposite end marginal portions, spacer member 227 is provided with preformed hook portions 229 and 231 which correspond in configuration to the hook portions of the panel members described herein previously. Thus, each spacer framework member utilized in the wall construction of FIG. 20 may be hook and snap locked in engagement with the respective inner and outer panel assemblies 225 and 226 in the same manner discussed herein previously with respect to other illustrated embodiments.

To that end, the inner and outer panel assemblies are defined by panels 232, 233 and 234, 236 respectively which are hook and snap locked with inner and outer connecting members 237 and 238 respectively. Decorative closure strips 239 and 241, which correspond to strip 94 shown in FIG. 9, complete the inner and outer panel assemblies of FIG. 20.

The respective connecting members 237 and 238 each comprises a main body portion 242 and 243 respectively which is constructed in accordance with the construction of connecting member 53 described previously herein. However, each member 237 and 230 also includes a hook shaped integral extension, designated 244 and 246 respectively, by means of which the spacer framework member 227 may be hook and snap locked in engagement therewith in the manner characteristic of this invention as previously described herein. FIG. 20 illustrates two modifications of the connecting member which may be utilized in a wall construction of the type described. Inner connecting member 237 constitutes a one piece extrusion in which the hook shaped extension 244 thereof is formed as a single piece with the main body portion 242 thereof. However, for reasons to be described, outer connecting member 238 constitutes two pieces (the main body portion 243 and the hook shaped extension 246) integrally joined together by a series of fasteners (such as rivets 249) which extend through the body portion 243 and a flange portion 251 of the hook shaped extension 246.

The purpose in forming outer connecting member 238 in two pieces as shown is so that a sheet, or sheets, of sound or other insulating material may be interposed between the flange portion 251 and the main body portion 243 of the connecting member 238 to impart insulating characteristics to the wall construction. The rivets 249 may be positioned through the connecting member portions during assembly of the wall construction in any known fashion.

If desired, a two piece connecting member, with associated insulation panel, also may be utilized in conjunction with the inner panel assembly 225 if double insulation characteristics are desired. Additionally, the spaces between the inner and outer panel assemblies 225 and 226 may be filled with insulation material as shown in FIG. 7.

With the embodiment shown in FIG. 20, an effective and structurally secure wall construction may be readily assembled utilizing the basic concepts of this invention.

Having thus shown and described various embodiments of the novel panel assembly structures and procedures for assembling the same, reference is directed to the appended claims for the scope of protection to be afforded thereto.

I claim:

1. A panel assembly comprising first and second performed panel members and an intermediate connecting member interposed between said panel members and securely interconnecting the same without utilizing separate fasteners to effect and maintain such interconnection and without permanently deforming any of said members during such interconnection: each of said first and second panel members comprising a fully preformed marginal portion which is defined by a reversely directed preformed integral hook section extending transversely thereof, and a generally flat preformed deformable tongue section projecting from said hook section and terminating in an edge portion to be wedged in direct non-slidable contact with an abutment shoulder of said connecting member; said connecting member comprising a fully preformed elongated channel member defined by a base portion, a pair of opposed inwardly facing and reversely directed preformed hook portions extending along said base portion at opposite margins thereof, and a generally rigid and unyielding preformed abutment shoulder projecting from said base portion intermediate said opposed hook portions; said hook portion of each of said first and second panel members being securely interfitted and engaged in direct nonslidable locking contact respectively with a hook portion of said connecting member with said tongue section of each panel member overlying and contacting at least part of said base portion of said connecting member with said edge portion of each panel member wedged in direct non-slidable locking contact against such abutment shoulder of said connecting member; interconnection of said panel members with said connecting member being effected by hooking said hook portion of each said panel member beneath a hook portion of said connecting member and thereafter depressing each said tongue section of each said panel member into direct wedging contact with said abutment shoulder of said connecting member to thereby urge said hook portions of said panel members into said non-slidable locking contact with associated hook portions of said connecting member without altering thereby the preformed configurations of said marginal portions of said panel members or of said connecting member or deforming or otherwise distorting said abutment shoulder.

2. The assembly of claim 1 in which said hook portions of said connecting member are slightly longer than said hook portions of said panel members whereby a space is provided between said interfitted hook portions of said panel members and said connecting member which permits interconnection thereof in hook and snap-lock fashion.

3. The assembly of claim 1 which includes a decorative closure strip interfitted with said panel members and said connecting member, said strip overlying said tongue sections of said panel members and said base portion and abutment shoulder of said connecting member, whereby said tongues and said connecting member are hidden from view.

4. The assembly of claim 1 in which said connecting member base portion is generally flat, and in which said panel members extend from said connecting member generally in opposite directions so that said panel members are generally in coplanar relationship.

5. The assembly of claim 1 in which said connecting member base portion includes two generally flat sections which extend at a predetermined angle relative to each other; and in which said panel members extend from said connecting member in opposite directions generally in accordance with said predetermined angle, whereby a corner joint is defined by said assembly.

6. The assembly of claim 1 in which said connecting member is preformed with a curvilinear configuration, and in which said tongue section of each of said panel members includes a series of separate bendable tabs which are engageable with said connecting member independently of each other so that said panel members may conform to the curvilinear configuration of said connecting member.

7. The assembly of claim 1 in which said abutment shoulder includes at least one ratchet tooth on opposite sides thereof against which said edge portions of said tongue sections of said panel members are engaged.

8. The assembly of claim 1 which further includes an insulation panel fixedly secured to and carried by each of said panel members, whereby said assembly is adapted to constitute part of an insulated wall, ceiling or like structure.

9. The assembly of claim 3 in which said abutment shoulder of said connecting member includes means engageable by said closure strip to retain said strip in place, and in which said closure strip includes a projecting portion extending therefrom engaged with said abutment shoulder and holding said strip engaged therewith.

10. The assembly of claim 9 in which said abutment shoulder means comprises a groove formed therein, and in which said closure strip projecting portion comprises a bulbous portion received in and retained in said groove.

11. A double-faced panel assembly comprising inner and outer panel surfaces operatively interconnected with each other, comprising a supporting framework member; first and second connecting members secured to said framework member on opposite sides thereof; and first and second pairs of preformed panel members interconnected with said connecting members, the panel members of each said pair extending generally in opposite directions from their associated connecting member; each of said panel members of said first and second pairs of panel members comprising a fully preformed marginal portion which is defined by a reversely directed preformed integral hook section extending transversely thereof, and a generally flat preformed deformable tongue section projecting from said hook section and terminating in an edge portion to be wedged in direct non-slidable locking contact with an asociated connecting member; each of said connecting members comprising a fully preformed elongated channel member defined by a base portion, a pair of opposed inwardly facing and reversely directed preformed hook portions extending along said base portion at opposite margins thereof, and a generally rigid and unyielding preformed abutment shoulder projecting from said base portion intermediate said opposed hook portions; said hook portion of each of said panel members of said first and second pair of panel members being securely interfitted and engaged in direct non-slidable locking contact respectively with a hook portion of an associated connecting member with said tongue section of each panel member overlying and contacting at least part of said base portion of an associated connecting member with said edge portion of each panel member wedged in direct non-slidable locking contact against said abutment shoulder of an associated connecting member; interconnection of said panel members with said connecting members being effected by hooking said hook portion of each said panel member beneath a hook portion of an associated connecting member and thereafter depressing said tongue section of said panel member into said direct wedging contact with said abutment shoulder of such connecting member to thereby urge said hook portions of said panel members into said direct non-slidable locking contact with associated hook portions of said connecting members without altering thereby the preformed configurations of said marginal portions of said panel members or of said connecting members or deforming or otherwise distorting said abutment shoulders.

12. The assembly of claim 11 in which said framework member is positioned at a corner of said assembly, and in which said base portion of each of said connecting members includes two generally flat sections which extend at a predetermined angle relative to each other; and in which said panel members of each of said pairs of panel members extend from their associated connecting member in opposite directions generally in accordance with said predetermined angle to define a corner joint in said assembly.

13. The assembly of claim 11 which includes insulation between said panel members of said pairs of panel members.

14. The assembly of claim 13 in which said insulation comprises insulation panels secured to and carried by each of the respective panel members of said pairs of panel members.

15. A panel assembly comprising first and second connecting members and at least one preformed panel member interconnected with said connecting members; said panel member extending between said connecting members; said panel member including a fully preformed marginal portion along each of opposite edge sections thereof, each of said opposite edge sections being defined by a reversely directed preformed integral hook portion extending transversely thereof, and a generally flat preformed deformable tongue section projecting from said hook portion and terminating in an edge portion to be wedged in direct non-slidable locking contact with an associated connecting member; each of said connecting members comprising a full preformed elongated channel member defined by a base portion, an inwardly facing and reversely directed preformed hook portion extending along said base portion, and a generally rigid and unyielding preformed abutment shoulder projecting from said base portion; said hook portions of said panel member being securely interfitted and engaged in direct non-slidable locking contact respectively with a hook portion of an associated connecting member with each said tongue section of said panel member overlying and contacting at least part of said base portion of an associated connecting member with each said edge portion of said panel member wedged in direct non-slidable locking contact against said abutment shoulder of an associated connecting member; interconnection of said panel member with said connecting members being effected by hooking each said hook portion of said panel member beneath a hook portion of an associated connecting member and thereafter depressing each said tongue section of said panel member into said direct wedging contact with said abutment shoulder of said associated connecting member to thereby urge said hook portions of said panel member into said non-slidable locking contact with associated hook portions of said connecting members without altering thereby the preformed configurations of said marginal portions of said panel member or of said connecting members or deforming or otherwise distorting said abutment shoulders.

16. The assembly of claim 15 in which said assembly includes insulation material secured to and carried by said panel member.

17. A panel assembly construction comprising first and second preformed panel members, an intermediate connecting member interposed between said panel members and securely interconnecting the same without utilizing separate fasteners to effect and maintain such interconnection, and another preformed member connected with said connecting member and extending therefrom; each of said first and second panel members and said other member comprising a fully preformed marginal portion which is defined by a reversely directed preformed integral hook section extending transversely thereof, and a generally flat preformed deformable tongue section projecting from each said hook section and terminating in an edge portion to be wedged in direct non-slidable locking contact with said connecting member; said connecting member comprising a fully preformed elongated channel member defined by a base portion, a pair of opposed inwardly facing and reversely directed preformed hook portions extending along said base portion at opposite margins thereof, a generally rigid and unyielding preformed abutment shoulder projecting from said base portion intermediate said opposed hook portions, and an integral preformed hook shaped extension projecting from said base portion generally in a direction opposite from said abutment shoulder, said extension having another generally rigid and unyielding preformed abutment shoulder in association therewith; each said hook portion of each of said first and second panel members and of said other member being securely interfitted and engaged in direct non-slidable locking contact respectively with an associated hook portion of said connecting member and with said extension of said connecting member with each said tongue section of each panel member and of said other member overlying and contacting at least part of said base portion and said extension of said connecting member with each of said edge portion of each panel member and of said other member wedged in direct non-slidable locking contact against the associated abutment shoulders of said connecting members; interconnection of said panel members and said other member with said connecting member being effected by hooking each said hook portion of said panel members and said other member beneath an associated hook portion of said connecting member and said extension and thereafter depressing each said tongue section of said panel members and said other member into said direct wedging contact with said abutment shoulders of said connecting member to thereby urge said hook portions of said panel members into said non-slidable locking contact with said connecting member without altering thereby the preformed configuration of said marginal portions of said panel members or of said other member or of said connecting member or deforming or otherwise distorting said abutment shoulders.

18. The assembly construction of claim 17 in which said hook portions of said connecting member and of said extension thereof are slightly longer than said hook portions of said panel members and of said other member whereby spaces are provided between said interfitted hook portions of said panel member and said other member and said connecting member and said extension thereof which permit interconnection thereof in hook and snap-lock fashion.

19. The assembly construction of claim 17 in which said connecting member extension is formed as one piece with said base portion thereof.

20. The assembly construction of claim 17 in which said connecting member extension is formed separate from said base portion thereof and is secured thereto by fasteners, and in which said construction further includes insulating material interposed between said base portion and said extension which is held in place there-between by said fasteners.

21. A double-faced panel assembly comprising inner and outer panel surfaces operatively interconnected with each other, comprising a spacer framework member; first and second connecting members integral with said framework member on opposite sides thereof; said first and second pairs of preformed panel members interconnected with said connecting members, the panel members of each pair extending generally in opposite directions from their associated connecting member; said spacer framework member and each of said panel members of said first and second pairs of panel members including a fully preformed marginal portion which is defined by a reversely directed preformed integral hook section extending transversely thereof, and a generally flat preformed deformable tongue section projecting from said hook section and terminating in an edge portion to be wedged in direct non-slidable locking contact with an associated connecting member; each of said connecting members comprising a fully preformed elongated channel member defined by a base portion, a pair of opposed inwardly facing and reversely directed preformed hook portions extending along said base portion at opposite margins thereof, a generally rigid and unyielding preformed abutment shoulder projecting from said base portion intermediate said hook portions, and an integral preformed hook shaped extension projecting from said base portion in a direction generally opposite said abutment shoulder, said extension having another generally rigid and unyielding preformed abutment shoulder associated therewith; said hook portion of each of said panel members of said first and second pair of panel members being securely interfitted and engaged in direct non-slidable locking contact respectively with a hook portion of an associated connecting member with said tongue section of each panel member overlying and contacting at least part of said base portion of an associated connecting member with said edge portion or each panel member wedged in direct non-slidable locking contact against an associated abutment shoulder of an associated connecting member; said hook portions of said framework member being engaged with said hook shaped extensions of said connecting member and extending laterally therebetween with each said edge portion of said framework member being wedged in direct non-slidable locking contact against an associated abutment shoulder of an associated connecting member; interconnection of said panel members and said framework member with said connecting members being effected by hooking each said hook portion of said panel members and said framework member beneath an associated hook portion of an associated connecting member and thereafter depressing each said tongue section of said panel members and said framework member into said direct wedging contact with said abutment shoulders of said associated connecting member to thereby urge said hook portions of said panel members and said framework member into said direct non-slidable locking contact with associated hook portions of such connecting member without altering thereby the preformed configurations of said marginal portions of said panel members or of said framework member or of said connecting members or deforming or otherwise distorting said abutment shoulders.

22. A panel assembly construction comprising first and second preformed connecting members and at least one preformed spacer member interconnected with said connecting members: said spacer member extending between said connecting members and including a fully preformed hook shaped portion along opposite edge margins thereof each of which is defined by an integral reversely directed preformed hook portion extending transversely thereof, and a generally flat preformed deformable tongue section projecting from said hook portion and terminating in an edge portion to be wedged in direct locking contact with an associated connecting member; each of said connecting members comprising a base portion and a fully preformed integral reversely directed hook shaped extension projecting from said base portion; said respective hook portions of said spacer member being directly engaged in non-slidable locking contact respectively with an extension of an associated connecting member with each said tongue section of said spacer member overlying and contacting at least part of said extension of an associated connecting member with said edge portion of said spacer member wedged in direct non-slidable locking contact against said base portion of an associated connecting member; interconnection of said spacer member with said connecting members being effected by hooking each said hook portion of said spacer member beneath an associated hook portion of an associated connecting member and thereafter depressing each said tongue section of said spacer member into said direct wedging contact with said base portion of an associated connecting member to thereby urge said hook portions of said spacer member into said non-slidable locking contact with said connecting members without altering thereby the preformed configurations of said marginal portions of said spacer member or of said connecting members or deforming or otherwise distorting said base portion of said connecting members.

23. The assembly construction of claim 22 in which said connecting member extension is formed as one piece with said base portion thereof.

24. The assembly construction of claim 22 in which said connecting member extension is formed separate from said base portion thereof and is secured thereof by fasteners, and in which construction further includes insulating material interposed between said base portion and said extension which is held in place there-between by said fasteners.

* * * * *